US005489734A

United States Patent [19]
Nagel et al.

[11] Patent Number: 5,489,734
[45] Date of Patent: Feb. 6, 1996

[54] METHOD FOR PRODUCING A NON-RADIOACTIVE PRODUCT FROM A RADIOACTIVE WASTE

[75] Inventors: Christopher J. Nagel, Wayland, Mass.; Robert D. Bach, Gross Pointe, Mich.

[73] Assignee: Molten Metal Technology, Inc., Waltham, Mass.

[21] Appl. No.: 46,016

[22] Filed: Apr. 12, 1993

Related U.S. Application Data

[63] Continuation-in-part of Ser. No. 788,804, Nov. 7, 1991, Pat. No. 5,202,100.

[51] Int. Cl.⁶ .......................................................... G21F 9/00
[52] U.S. Cl. ........................................ 588/1; 588/201
[58] Field of Search ............................... 252/626; 423/2; 588/201, 1

[56] References Cited

U.S. PATENT DOCUMENTS

| | | | |
|---|---|---|---|
| 3,843,766 | 10/1974 | Anderson et al. | 23/327 |
| 3,867,510 | 2/1975 | Miller et al. | 423/4 |
| 4,145,396 | 3/1979 | Grantham | 423/22 |
| 4,574,714 | 3/1986 | Bach et al. | 110/346 |
| 4,591,454 | 5/1986 | Ohtsuka et al. | 252/626 |
| 4,602,574 | 7/1986 | Bach et al. | 100/346 |
| 4,657,585 | 4/1987 | Yazawa et al. | 75/63 |
| 4,895,678 | 1/1990 | Ohtsuka et al. | 252/632 |
| 5,041,193 | 8/1991 | Grantham | 204/1.5 |
| 5,177,304 | 1/1993 | Nagel | 588/201 |
| 5,202,100 | 4/1993 | Nagel et al. | 423/5 |

FOREIGN PATENT DOCUMENTS 55-44917 of 1980 Japan.

OTHER PUBLICATIONS

Abe et al., "A Melt Refining Method for Uranium Contaminated Steels and Copper", *Proc. of Waste Mgmt.*, pp. 375–379 (1985).

Heshmatpour et al., "The Effects of Slag Composition and Process Variables on Decontamination of Metallic Wastes by Melt Refining", Oak Ridge National Laboratory, ORNL/TM-7501 (1981).

Heshmatpour et al., "Decontamination of Transuranic Waste Metal by Melt Refining", Oak Ridge National Laboratory, ORNL/TM-7951 (1981).

Heshmatpour et al., "Metallurgical Aspects of Waste Metal Decontamination by Melt Refining", *Nuc. Chem. Waste Mgmt.*, 2:25–31 (1981).

Irving Johnson, "The Thermodynamics of Pyrochemical Processes for Liquid Metal Reactor Fuel Cycles", *J. of Nuc. Matl.*, 154:169–180 (1988).

Seitz et al., "Decontamination of Metals Containing Plutonium and Americium", Argonne National Laboratory, ANL-78-13 (1979).

Uda, et al., "Melting of Uranium–Contaminated Metal Cylinders by Electroslag Refining", *Nuclear Technology*, 79:328–337 (1987).

Uda et al., "Decontamination of Uranium–Contaminated Mild Steel by Melt Refining", *Nuclear Technology*, 73:109–115 (1986).

Uda et al., "A Melt Refining Method for Uranium–Contaminated Aluminum", *Nuclear Technology*, 72:178–83 (1986).

*Primary Examiner*—Ngoclan Mai
*Attorney, Agent, or Firm*—Hamilton, Brook, Smith & Reynolds

[57] ABSTRACT

A method is disclosed for producing a non-radioactive product from a radioactive waste composition that includes a radioactive component and a non-radioactive component. The method includes directing the radioactive waste into a molten metal bath. A separation agent is directed in the molten metal bath which reacts with a component of the radioactive waste composition to form a reaction product which separates from the remaining component, thereby forming a non-radioactive product. The separation reagent can be, for example, an oxidant, a metal-ligand exchange reagent, or a reducing agent. The non-radioactive product can be a gas, a liquid, or a precipitate.

46 Claims, 5 Drawing Sheets

METHOD FOR PRODUCING A NON-RADIOACTIVE PRODUCT FROM A RADIOACTIVE WASTE

RELATED PATENT APPLICATION

This is a Continuation-in-Part of Ser. No. 07/788,804, filed Nov. 7, 1991, U.S. Pat. No. 5,202,100, the teachings of which are incorporated herein by reference.

BACKGROUND OF THE INVENTION

Radioactive waste has many forms, such as spent fuel from nuclear reactors, and contaminated glassware and spent ion exchange resins generated by medical and chemical laboratories. Radioactive components are often only a small percentage, by weight, of the total weight of such wastes. However, the half life of radioactive waste can be hundreds or thousands of years, thus requiring a permanent disposal solution.

Typically, radioactive waste is disposed of by burial in specially prepared disposal sites, such as in land fills, which are lined or capped, or in deep underground mines. However, large volumes of radioactive wastes are difficult to contain. For example, landfills can develop leaks over time, thereby allowing radioactive components to leach from the landfill site and into municipal water supplies. Also, mines can become flooded and contaminate water which subsequently escapes. Further, suitable space for disposal of radioactive waste is limited. The rate at which radioactive waste is generated is also much greater than the rate at which new burial sites are becoming available.

Therefore, a need exists for a method of reducing the volume of radioactive compositions, such as radioactive wastes, which include a radioactive component.

SUMMARY OF THE INVENTION

The present invention relates to a method for producing a non-radioactive product from a radioactive waste composition that includes a radioactive component and a non-radioactive component.

The method includes directing the radioactive waste composition into a molten metal bath. A separation reagent is directed into the molten metal bath which reacts with a component of the radioactive waste composition to form a reaction product that separates from the molten metal bath and from the remaining component, thereby forming a non-radioactive product.

The advantages of this invention include, for example, production of a non-radioactive product from a radioactive waste composition. The separation reagent can react with either the radioactive component or the non-radioactive component of the waste to cause separation of the radioactive component from the non-radioactive component, thereby producing the non-radioactive product. In one embodiment, the separation reagent reacts with the radioactive component to form, for example, either a precipitate, an insoluble liquid, or a gas, which separates from the molten metal bath into which the radioactive waste composition has been directed for treatment. If the radioactive reaction product is a precipitate or an insoluble liquid, it can migrate to the top of the molten metal bath to form a vitreous layer. The molten metal bath, containing the non-radioactive component, can then be removed from the reactor as a non-radioactive product stream.

Alternatively, the separation reagent can react with the non-radioactive component of the waste to cause a non-radioactive reaction product to separate from the molten metal bath containing the radioactive component of the waste. The non-radioactive reaction product can be, for example, an insoluble liquid, a precipitate, or a gas. In still another embodiment, radioactive components within a waste composition can be separated from each other, either before or after separation from a non-radioactive component of the waste. In all embodiments, a radioactive waste composition is treated to produce a non-radioactive product. Further, radioactive components separated from the waste composition during treatment have of substantially smaller volume than that of the radioactive waste composition before treatment, thereby facilitating subsequent disposal of the radioactive components.

DETAILED DESCRIPTION OF THE INVENTION

Figure 1:
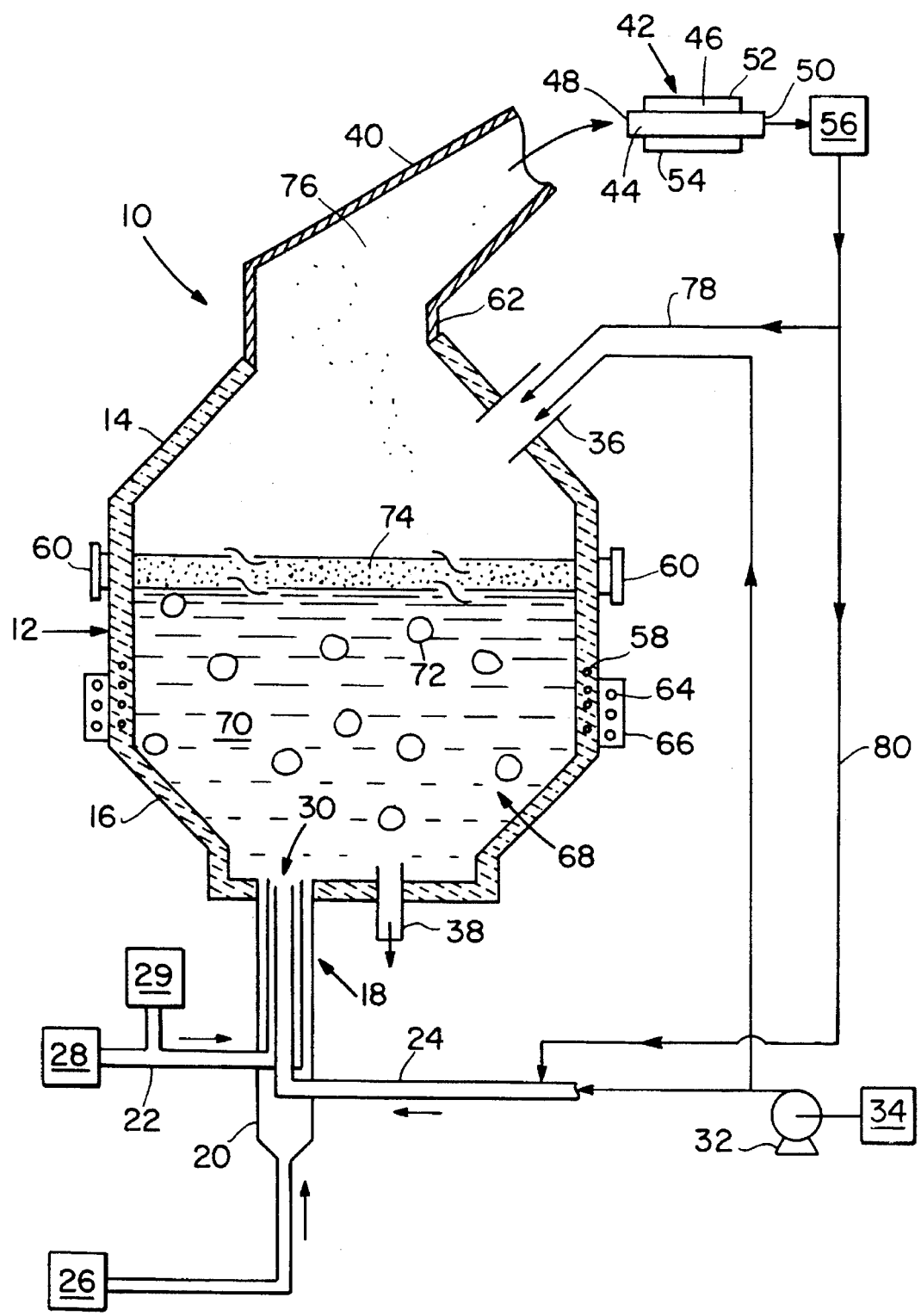
FIG. 1 is a schematic representation of a system for reducing the volume of radioactive compositions by employing the method of the invention.

The features and other details of the method of the invention will now be more particularly described with reference to the accompanying drawing and pointed out in the claims. It will be understood that the particular embodiments of the invention are shown by way of illustration and not as limitations of the invention. The principle features of this invention can be employed in various embodiments without departing from the scope of the invention.

The invention relates to a method for producing a non-radioactive product from a radioactive waste composition that includes a radioactive component and a non-radioactive component. System 10, shown in the Figure, is one illustration of a system suitable for conducting the method of the invention. System 10 includes reactor 12. Examples of suitable reactors include K-BOP, Q-BOP, argon-oxygen decarbonization furnace (AOD), EAF, etc., such as are known in the art of steel making. Examples of other suitable systems for conducting the method of the invention are disclosed in U.S. Pat. No. 4,602,574, U.S. Pat. No. 4,574, 714 and U.S. Pat. No. 5,177,304, the teachings of all of which are incorporated herein by reference. Reactor 12 has upper portion 14 and lower portion 16.

Tuyere 18 includes shroud gas tube 20, reagent inlet tube 22 and radioactive composition inlet tube 24. Conduit 21 extends from shroud gas source 26 to shroud gas tube 20. Conduit 23 extends from reagent source 28 to reagent inlet tube 22. Reagent inlet tube 22 is disposed within shroud gas tube 20 at tuyere opening 30. Radioactive composition inlet tube 24 is disposed within reagent inlet tube 22 at tuyere opening 30. Pump 32 is disposed at conduit 25 to direct a suitable radioactive composition from radioactive composition source 34 to radioactive composition inlet tube 24.

Tuyere 18 is dimensioned and configured for introducing a suitable radioactive composition and a suitable reagent into reactor 12. It is to be understood, however, that a shroud gas, the radioactive composition and the reagent can be introduced to reactor 12 separately or intermittently or both, rather than conjointly or continuously or both. It is also to be understood that more than one tuyere 18 can be disposed in reactor 12 and that concentric, or multiple concentric tuyeres, can be employed for separate introduction of reactants, such as the radioactive component and the reagent, into reactor 12. For example, the radioactive composition can be introduced through a first double concentric tuyere, not shown, and the reagent can be separately introduced through a second double concentric tuyere, also not shown, as an alternative to employing tuyere 18. Double concentric tuyeres, such as for separate introduction of a radioactive composition and a reagent, can be located proximate to or remote from each other in reactor 12. Further, it is to be understood that the reagent and the radioactive composition can be introduced into reactor 12 by other suitable methods. For example, the radioactive composition can also be directed into reactor 12 through radioactive composition inlet 36 or by top-blowing the radioactive composition into reactor 12.

Bottom-tapping spout 38 extends from lower portion 16 and is suitable for removal of at least a portion of a molten bath from reactor 12. Material can also be removed by other methods, such as are known in the art. For example, material can be removed from reactor 12 by rotating reactor 12 or by employing a launder, not shown, extending from radioactive composition inlet 36. Alternatively, the launder can extend into reactor 12 through a tap hole, also not shown.

Off-gas outlet 40 is disposed at upper portion 14 of reactor 12 and extends to heat exchanger 42. Heat exchanger 42 has off-gas side 44 and cooling medium side 46. Off-gas side 44 has heat exchanger inlet 48 and heat exchanger outlet 50. Cooling medium side 46 has cooling medium inlet 52 and cooling medium outlet 54. Examples of suitable heat exchangers include water-cooled hoods, shell and tube heat exchangers, etc. A suitable cooling medium can be any medium for cooling off-gas in heat exchanger 42. Examples of suitable cooling media include, for example, water, ethylene glycol, ethyl benzene, alcohols, etc.

Scrubber means 56 is disposed at heat exchanger outlet 50. Scrubber means is suitable for exposing the off-gas to conditions sufficient to remove at least a portion of off-gas from off-gas stream. As an example, scrubber means is a scrubber which can include a wet-venturi scrubber, etc. Further, it is to be understood that off-gas can be cooled and separated by other suitable methods. In one embodiment, the off-gas is cooled and separated according to the method and system described in U.S. patent application Ser. No. 07/737,048, entitled "Method and System for Controlling Chemical Reaction in a Molten Bath," the teachings of which are incorporated herein by reference. Alternatively, the off gas and particulates suspended therein can be treated by the method and apparatus described in U.S. Patent Application entitled "Method and Apparatus for Treating a Gas Formed From a Waste in a Molten Metal Bath," and filed Apr. 1, 1993, the teachings of which are incorporated herein by reference.

Induction coil 58 is disposed at lower portion 16 for heating reactor 12 or for initiating generation of heat within reactor 12. It is to be understood that, alternatively, reactor 12 can be heated by other suitable means, such as by plasma, oxyfuel burners, electric arc, etc. Trunions 60 are disposed at reactor 12 for manipulation of reactor 12 and off-gas outlet tube 40. Seal 62 is disposed between reactor 12 and off-gas outlet tube 40. Trunions 60 are suitable for allowing partial rotation of reactor 12 about trunions 60 without breaking seal 62. Alternatively, reactor 12 does not include trunions or a seal and does not rotate.

Coil 64 is disposed on the exterior of reactor 12 for transferring heat from reactor 12. Coil 64 is covered by insulation 66 and contains a suitable heat transfer medium, such as water or liquid metal. The heat transfer medium is circulated through coil 64 by a suitable means, such as a pump, not shown, to thereby transfer heat from reactor 12.

A reaction zone within system 10 includes molten metal bath 68, vitreous layer 74 and gas layer 76. Molten metal bath 68 includes at least one metal, whereby oxidation of a radioactive first component or a second component of a radioactive composition will cause separation of the radioactive first component from the second component. Examples of suitable metals in molten metal bath 68 include iron, chromium, manganese, copper, nickel, cobalt, etc. It is to be understood that molten metal bath 68 can include a solution of metals. Also, it is to be understood that molten metal bath 68 can include oxides or salts or metals. Molten metal bath 68 can include more than one phase of molten metal, as disclosed in U.S. Pat. No. 5,177,304, the teachings of which are incorporated herein by reference. For example, molten metal bath 68 can include substantially immiscible molten metal phases 70,72. However, in all embodiments, a substantial portion of molten metal bath 68 is formed of at least one metal in its elemental form.

Molten metal bath 68 is formed by at least partially filling reactor 12 with at least one suitable metal. The metal is then heated to a suitable temperature by activating induction coil 64 or by other means, not shown. Where two immiscible metals are introduced to reactor 12, the metals separate during melting to form distinct molten metal phases 70,72.

Vitreous layer 74 is disposed on molten metal bath 68. Vitreous layer 74 is substantially immiscible with molten metal bath 68. Alternatively, system 10 does not include vitreous layer 74. Vitreous layer 74 includes at least one metal oxide. Examples of suitable metal oxides of vitreous layer 74 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Other examples of suitable components of vitreous layer 74 include halogens, sulfur, phosphorus, heavy metals, etc. It is to be understood that vitreous layer 74 can include more than one metal oxide. Radioactive inorganic components of the radioactive composition can also be included in vitreous layer 74. Vitreous layer 74 can contain more than one phase. Typically, vitreous layer 74 is substantially fluid so that free radicals and other gases can pass across vitreous layer 74 from molten metal bath 68.

Gas layer 76 is disposed over molten metal bath 68 and, if present, vitreous layer 74. In one embodiment, gas layer 76 extends from upper portion 14 of reactor 12 through off-gas outlet 40 to scrubber means 56. Gas layer 76 includes off-gases which are reaction products, such as hydrogen, water vapor, carbon monoxide and carbon dioxide. The off-gas can include a radioactive first component of the radioactive composition.

Suitable operating conditions of system 10 include a temperature sufficient to cause a component of a radioactive composition directed into reactor 12 to react with a separation reagent, whereby a radioactive component is separated from a non-radioactive component of the radioactive composition. In one embodiment, the temperature of molten metal bath 68 is in the range of between about 1,000° and 2,000° C.

In one embodiment of the method of the invention, a radioactive composition is directed from radioactive composition source 34 into the reaction zone. The radioactive composition, a separation reagent and the shroud gas are directed into molten metal bath 68 from radioactive composition source 34, reagent source 28 and shroud gas source 26, respectively. It is to be understood that the radioactive composition can be directed into reactor 12 by other suitable methods. For example, the radioactive composition can be directed into reactor 12 through radioactive composition inlet 36 as whole articles, such as radioactivity-contaminated clothing, contaminated piping, etc.

The radioactive composition includes a radioactive component and a non-radioactive component, whereby reaction of either component with the separation reagent causes separation of the radioactive component from the non-radioactive component. Examples of suitable radioactive compositions include low-level radioactive wastes, such as various hospital wastes, contaminated clothing, contaminated glassware and spent ion exchange resins generated by chemical laboratories, etc. Examples of radioactive components include: $^{32}P$; $^{35}S$; $^{51}Cr$; $^{54}Mn$; $^{55}Fe$; $^{58}Co$; $^{59}Fe$; $^{65}Zn$; $^{67}Ga$; $^{125}I$; $^{131}I$; $^{60}Co$; $^{3}H$; $^{90}Sr$; $^{137}Cs$; $^{63}Ni$; $^{63}Ni$ inactivated metal; $^{14}C$; $^{14}C$ inactivated metal; $^{94}Nb$ inactivated metal; $^{59}Ni$ inactivated metal; $^{99}Tc$; $^{129}I$; $\alpha$— emitting transuranic nuclides with half-lives of less than 5 years; $^{242}Cm$; $^{241}Pu$; etc. "Non-radioactive", as that term is used here, refers to materials that have a level of radioactivity that is effectively de minimus, in other words, materials which are not commonly associated with emission of radioactivity.

The separation reagent is suitable for reacting with a component of the radioactive composition in molten metal bath 68 to thereby cause separation of the radioactive component from the non-radioactive component. A "separation reagent," as that term is used herein, means a reagent which upon reaction with at least one of the components of the radioactive composition, forms a reaction product which includes that component, and which reaction product is substantially insoluble in molten metal bath 68. The insoluble reaction product can be in the form, for example, of a gas, an insoluble liquid, or a precipitate. Examples of separation reagents include oxidization agents, such as: oxygen gas or oxygen-containing compounds, including calcium oxide; halogens; chlorine-containing compounds; fluorine-containing compounds; and high-valent metal cations such as $Fe^{+3}$, $Cr^{+6}$ and $V^{30\ 6}$; etc. Alternatively, the separation reagent can be a metal-liquid exchange reagent. Examples of suitable metal-liquid exchange reagents include iron fluoride ($FeF_2$), magnesium oxide (MgO), calcium oxide (CaO), etc. In still another embodiment, the separation reagent can be a reducing agent, such as zirconium, uranium, etc.

The shroud gas is suitable for cooling the region within reactor 12 proximate to tuyere 18 under the operating conditions of system 10. Examples of suitable shroud gases include nitrogen gas ($N_2$), steam, methane ($CH_4$), chlorobenzene ($C_6H_5Cl$), etc. In one embodiment, nitrogen gas is exposed to the region.

The radioactive composition directed into reactor 12 combines with molten metal bath 68 and can also combine with vitreous layer 74. In one embodiment, at least a portion of the radioactive component and the non-radioactive component, which are to be separated by the method of the invention, dissolve in molten metal bath 68 and/or vitreous layer 74. Contact of the radioactive composition with the separation reagent in molten metal bath 68 or vitreous layer 74 cause either the radioactive component or the non-radioactive component of the radioactive composition to react with the separation reagent and thereby form a reaction product which is substantially insoluble in molten metal bath 68. The reaction product includes either the radioactive component or the non-radioactive component. The radioactive component is then separated from the non-radioactive component because the reaction product separates from molten metal bath 68 as a consequence of its substantial insolubility in molten metal bath 68. The reaction product can be in the form of a gas, an insoluble liquid, or a precipitate. Further, the reaction product, depending on its polarity, density, volatility, etc., can migrate out of molten metal bath 68. For example, the reaction product can migrate to gaseous layer 76, vitreous layer 74 or can form as a separate layer, not shown, below molten metal bath 68.

In another embodiment, either of the components can react with the separation reagent in one of two or more immiscible molten phases of molten metal bath 68, whereby the reaction product, containing either the radioactive or non-radioactive component, becomes insoluble in one phase and consequently migrates to another molten metal phase. For example, a radioactive component can be oxidized in molten metal phase 70 and migrate to molten metal phase 72 of molten metal bath 68. Alternatively, both the radioactive and the non-radioactive components can react with the separation reagent and subsequently migrate, whereby separation can be obtained by migration of the radioactive component and the non-radioactive component to different portions of the reaction zone. For example, the radioactive component can migrate to vitreous layer 74 while the second component can migrate to gas layer 76.

Separation of the radioactive component from the non-radioactive component is caused by reaction of either, or both, the radioactive component and the non-radioactive component. For example, oxidation of the radioactive first component can cause the radioactive first component to migrate from molten metal bath 68 to vitreous layer 74, while the non-radioactive component remains in molten metal bath 68, thereby separating the radioactive component from the non-radioactive component. Separation of the two components causes formation of a non-radioactive product. In the embodiment wherein the radioactive component has migrated out of molten metal bath 68, the non-radioactive product can be the molten metal of molten metal bath 68 and the remaining non-radioactive component of the radioactive composition. Alternatively, where the non-radioactive component of the radioactive composition reacts with the separation reagent and consequently separates from molten metal bath 68, the non-radioactive product can be, for example, the gas, insoluble liquid, or precipitate formed as the reaction product by reaction of the non-radioactive component with the separation reagent.

In another embodiment of the method of the invention, either the radioactive component or the non-radioactive component reacts with a first reagent to form an intermediate component. The intermediate component separates from the remaining component of the radioactive composition either by migration of the intermediate component or by migration of the remaining component out of molten metal bath 68. Alternatively, the component can separate by migration of either the intermediate component or the remaining component from one immiscible molten phase to another immiscible phase of molten metal bath 68, such as from molten metal phase 70 to molten metal phase 72.

A second reagent is then directed into the reaction zone by a suitable means for reaction with the intermediate component. For example, the second reagent can be directed into molten metal bath 68 from second reagent source 29 through reagent inlet tube 22 and tuyere 18 at lower portion 16 of reactor 12. Suitable second reagents include reagents which will react with the intermediate component. In one embodiment, the second reagent is a Group I or Group II metal or metal oxide. The second reagent is distinct from the first reagent. For example, in one embodiment, the first reagent can be fluorine and the second reagent can be calcium oxide. The second reagent reacts with the intermediate component to form a product. The product can migrate through the reaction zone to gas layer 76 for removal from reactor 12.

Gases, such as the reaction product, including the radioactive component or the non-radioactive component of the radioactive composition, which are released from molten metal bath 68 into gas layer 76, are directed through off-gas outlet 40 to heat exchanger 42. The gases are cooled in heat exchanger 42 and then directed to scrubber 56 for separation of components from the gas. An intermediate stream is thereby formed at scrubber 56 which can be treated, as described in U.S. Pat. No. 5,191,154, the teachings of which are incorporated herein by reference. For example, the intermediate stream can be returned to molten metal bath 68 through conduit 78 or conduit 80, or can be treated by another means, such as by directing the intermediate stream to another reactor, not shown.

In still another embodiment, the radioactive composition can include more than one radioactive element. The radioactive elements can exhibit greater and lesser degrees of radioactivity relative to each other. Different radioactive elements of the radioactive composition can be separated from each other by directing a suitable metal-ligand exchange reagent into reactor 12. For example, a radioactive composition that includes uranium (IV) oxide and plutonium (IV) oxide and nickel metal can be directed into a molten metal bath of nickel metal. The radioactive oxides migrate to a vitreous layer on top of the molten metal bath. A metal fluoride, such as nickel fluoride, can be directed into the vitreous layer for reaction with both of the radioactive oxides by a ligand-exchange reaction to form uranium (IV) fluoride and plutonium (IV) fluoride. The plutonium (IV) fluoride migrates to the molten metal bath with the nickel metal of the radioactive composition. The uranium (IV) fluoride volatilizes and leaves the vitreous layer as a gas, thereby separating from the plutonium of the radioactive waste composition. A reagent can then be directed into the molten metal bath to oxidize the plutonium fluoride and thereby cause formation of plutonium (IV) oxide, which subsequently migrates to the vitreous layer, leaving a non-radioactive product, nickel metal, in the molten metal bath. A "product," such as a non-radioactive product, as that term is defined herein, is a material which has been separated from a radioactive component of a radioactive composition. Alternatively, where the components of the radioactive waste are all radioactive, the product can be a less radioactive component (such as a material that is shorter-lived as a radioactive species) that has separated from a more radioactive component (such as a component that is longer-lived as a radioactive species).

Other, specific embodiments include separation of short-lived radionuclides, such as iodine, from long-lived nuclides, such as uranium and plutonium. In one example, a radioactive waste composition includes nickel metal, as a non-radioactive component, and uranium and plutonium as radioactive elements of the radioactive component. Direction of the radioactive composition into a molten nickel bath causes the iodine to volatilize and thereby separate from the plutonium, which remains in the molten nickel bath. A reagent can then be directed into the molten nickel bath to oxidize the plutonium and form plutonium (IV) oxide, which migrates to form a vitreous layer on top of the molten nickel bath. Nickel, as the non-radioactive product, collects in the molten nickel bath.

The following are illustrations of various applications of the method of the invention.

Illustration I

Iron piping or other metal storage containers and their contents, contaminated with radioactive uranium, is fed through radioactive composition inlet 36 into molten metal bath 68 of reactor 12. The radioactive first component of the radioactive composition is uranium. The second component is iron.

Oxygen gas, as a first reagent, is added continuously to molten metal bath 68 from reagent source 28 through reagent inlet tube 22 of tuyere 18. Nitrogen gas, as a shroud gas, is added to molten metal bath 68 from shroud gas source 26 through shroud gas tube 20 in tuyere 18. Carbon can be present in molten metal bath 68. Molten metal bath 68 has a temperature of about 1800° K.

Figure 2:
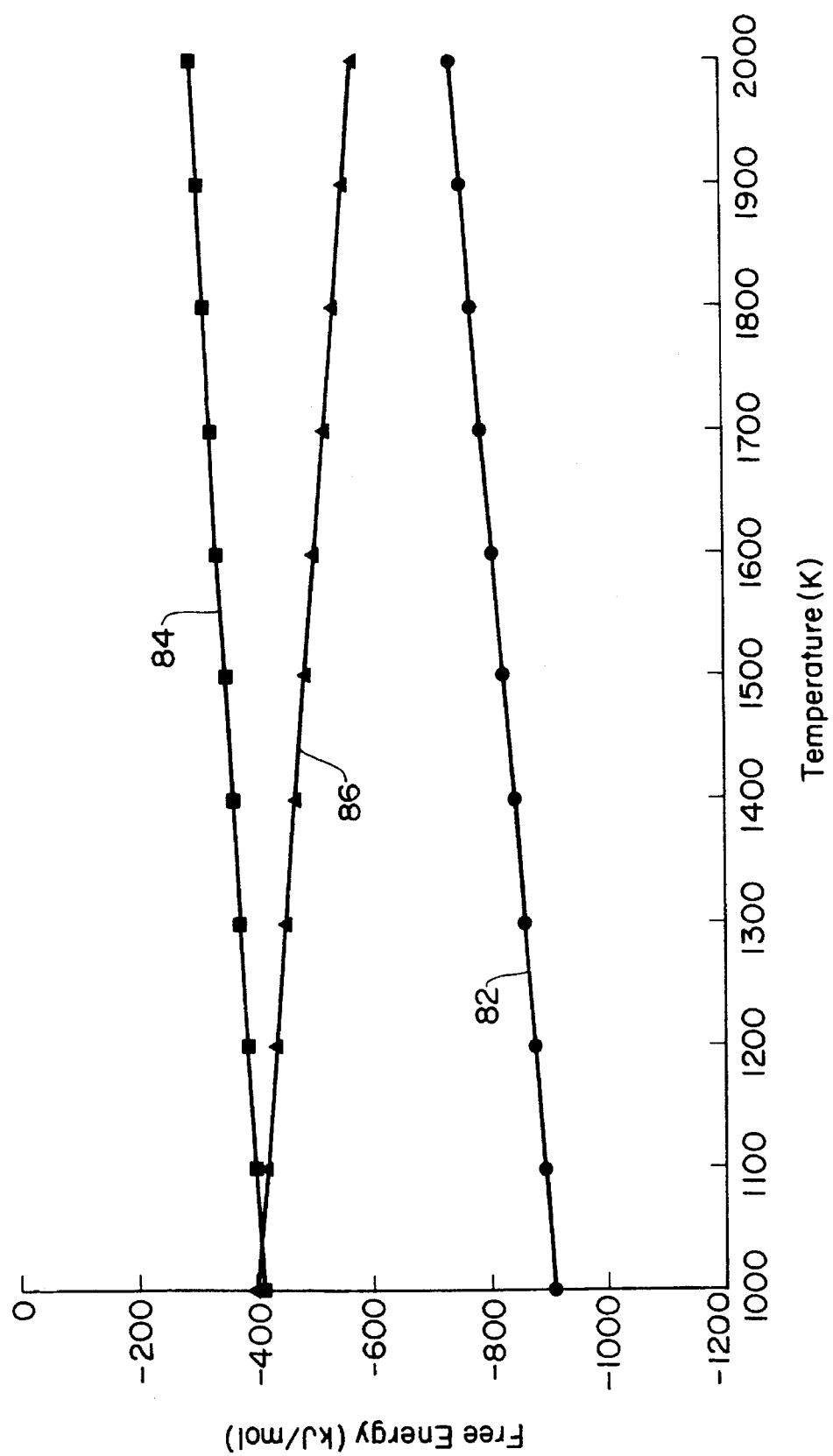
FIG. 2 is a plot of the free energies of oxidation of uranium, iron and carbon at the conditions of a molten bath employed in one embodiment of the method of the invention.

The radioactive first component of the radioactive composition is oxidized in molten metal bath 68 from uranium to uranium oxide by the first reagent. The reaction of the radioactive first component with the first reagent occurs preferentially to oxidation of iron or carbon molten metal bath 68 because, as can be seen in FIG. 2, the free energy of oxidation of uranium (Curve 82) is lower than that of iron (Curve 84) or carbon (Curve 86) at the temperature of molten metal bath 68. The radioactive first component migrates from molten metal bath 68 to vitreous layer 74. The second component of the radioactive composition is separated from the radioactive first component in molten metal bath 68 as the radioactive first component is oxidized. The volume of the radioactive composition is significantly reduced because the iron component has been separated from the radioactive first component, uranium. Vitreous layer 74, which includes radioactive first component, is removed from reactor 12 by a suitable means. The second component, iron, remains in molten metal bath 68. The second component can be removed from reactor 12 through bottom-tapping spout 38.

Illustration II

The radioactive composition includes discarded electrical transformers, containing about ten percent polychlorinated biphenyl ($C_{12}H_6Cl_4$), and contaminated with trace amounts of radioactive cobalt in a concentration of about one hundred parts per million. The radioactive composition also includes about fifty percent iron and about forty percent copper. The radioactive first component of the radioactive composition is a solution of the cobalt, iron and copper. The second component is the polychlorinated biphenyl.

The radioactive composition is directed into molten metal bath 68 of reactor 12 from radioactive composition source 34 through radioactive composition inlet 36. Oxygen gas and calcium oxide are added, as reagents, to molten metal bath 68 from reagent source 28 through reagent inlet tube 22. Nitrogen gas, as a shroud gas, is added to molten metal bath 68 from shroud gas source 26 through shroud gas tube 20 in tuyere 18. Molten metal bath 68 has a temperature of about 1800° K.

The radioactive first component of the radioactive composition accumulates in molten metal bath 68. The second component of the radioactive composition is thermally decomposed in molten metal bath 68 and vitreous layer 74 to form atomic carbon, chlorine and hydrogen. At least a portion of the carbon is oxidized to form carbon monoxide gas and calcium chloride is produced from chlorine and lime. Hydrogen gas is also generated. The carbon monoxide and hydrogen gas migrate from molten metal bath 68 across vitreous layer 74 to off-gas layer 76 and then is discharged from reactor 12. The calcium chloride accumulates in vitreous layer 74.

Illustration III

The radioactive composition includes radioactive ion exchange resin having a radioactive uranium isotope concentration of about two parts per million. The resin includes an organic component, polystyrene trimethylbenzlammonium salt. The radioactive first component of the radioactive composition includes uranium and chlorine, which are bound to the resin. The second component is the polystyrene trimethylbenzlammonium salt.

The radioactive composition is fed through tuyere 18 into molten metal bath 68 of reactor 12. Oxygen gas and calcium oxide are added as reagents to molten metal bath 68 from reagent source 28 through reagent inlet tube 22 in tuyere 18. Nitrogen gas, as a shroud gas, is added to molten metal bath 68 from shroud gas source 26 through shroud gas tube 20 in tuyere 18. Molten metal bath 68 has a temperature of about 1800° K.

The radioactive first component of the radioactive composition is oxidized by the first reagent in molten metal bath 68 to form uranium oxide and calcium chloride. The radioactive first component then migrates from molten metal bath 68 to vitreous layer 74.

The second component of the radioactive composition thermally decomposes to elemental carbon, nitrogen and hydrogen components of polystyrene trimethylbenzlammonium, and is separated from the radioactive first component in molten metal bath 68 as radioactive first component is oxidized and migrates to vitreous layer 74. The nitrogen and hydrogen volatilize from molten metal bath 68. The carbon can oxidize to form carbon monoxide gas, which also migrates to gas layer 76. The total volume of radioactive material can be reduced by a ratio greater than about twenty to one. When chlorine accumulates in the vitreous phase, further separation of the chlorinated compound to the gas phase reduces the total volume of radioactive material by a ratio greater than 100:1.

Illustration IV

A radioactive composition which includes calcium iodide ($CaI_2$) has a radioactive first component which is the iodine component of the calcium iodide, in the form of radioactive isotopes $^{125}I$, $^{129}I$ and $^{131}I$. The second component is the calcium component of the calcium iodide. The radioactive composition is fed from radioactive composition source 34 by pump 32 through radioactive composition tube 24 through tuyere opening 30 into molten metal bath 68 of reactor 12. Molten metal bath 68 includes nickel. Oxygen gas is directed into molten metal bath 68 as the first reagent from reagent source 28 through reagent inlet tube 22. Nitrogen gas, as a shroud gas, is added to molten metal bath 68 from shroud gas source 26 through shroud gas tube 20. Molten metal bath 68 has a temperature of about 1800° K.

Figure 3:
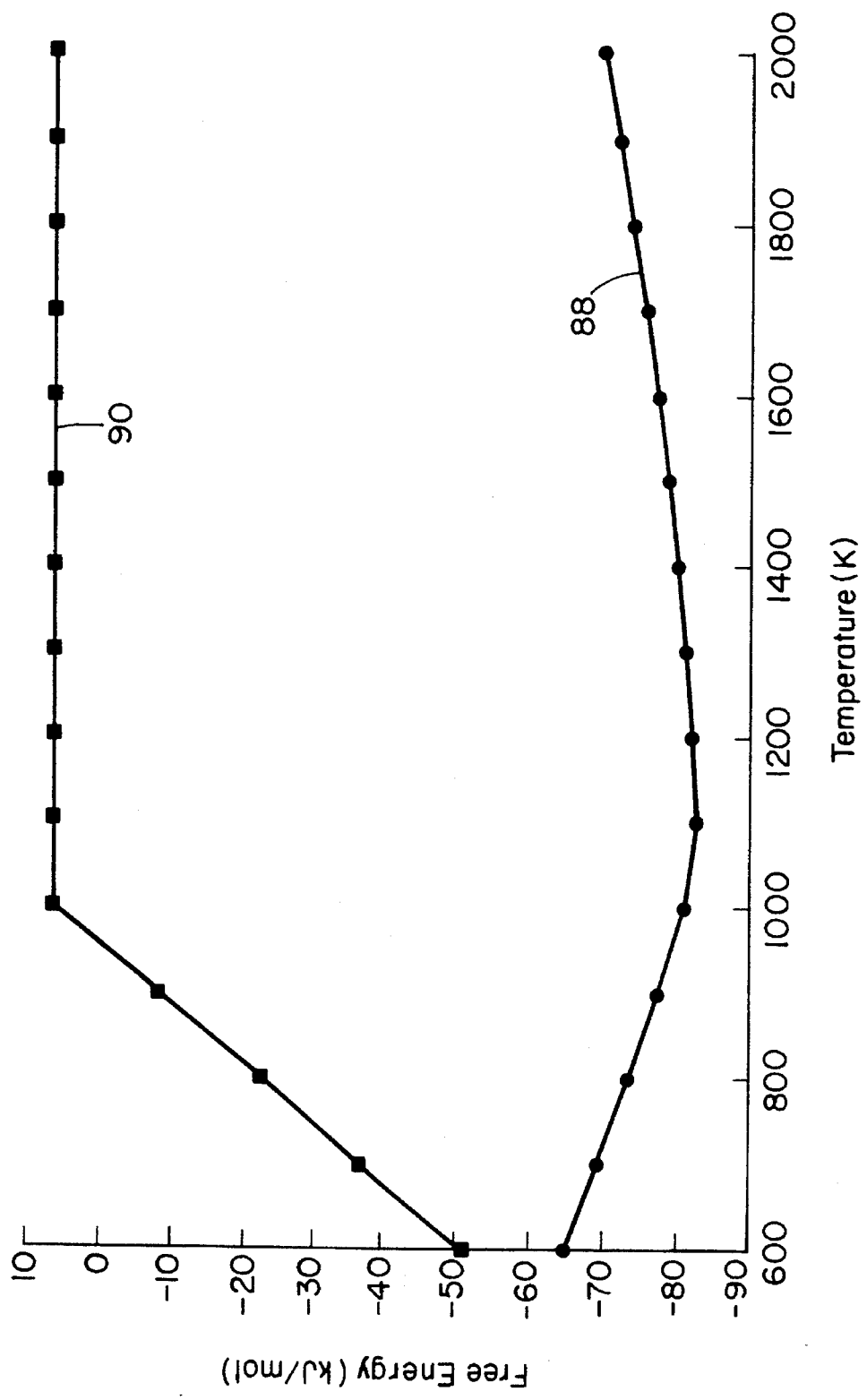
FIG. 3 is a plot of the free energies of reaction of iodine with a molten bath of nickel and calcium iodide with oxygen in another embodiment of the invention.

The second component of radioactive composition is oxidized to form calcium oxide and iodine ($I_2$). The first reagent reacts preferentially with the radioactive first component because the free energy of oxidation of the radioactive first component (Curve 88) is lower than that of the nickel (Curve 90) of molten metal bath 68, as can be seen in FIG. 3. The iodine volatilizes and migrates from molten metal bath 68 through vitreous layer 74 to gas layer 76 and out of reactor 12 through off-gas outlet tube 40. The second component migrates from molten metal bath 68 to vitreous layer 74 and accumulates in vitreous layer 74. Calcium fluoride ($CaF_2$) can be added to vitreous layer 74 to help maintain fluidity of vitreous layer 74.

Illustration V

The radioactive composition includes iron contaminated with radioactive uranium. The radioactive first component is the radioactive uranium. The second component is the iron. The radioactive composition is fed through radioactive composition inlet 36 into molten metal bath 68 of reactor 12. Chlorine gas is directed into molten metal bath 68, as a first reagent, to molten metal bath 68 from reagent source 28 through reagent inlet tube 22. Nitrogen gas, as a shroud gas, is added to molten metal bath 68 from shroud gas source 26 through shroud gas tube 20 in tuyere 18. Molten metal bath 68 has a temperature of about 1800° K.

Figure 4:
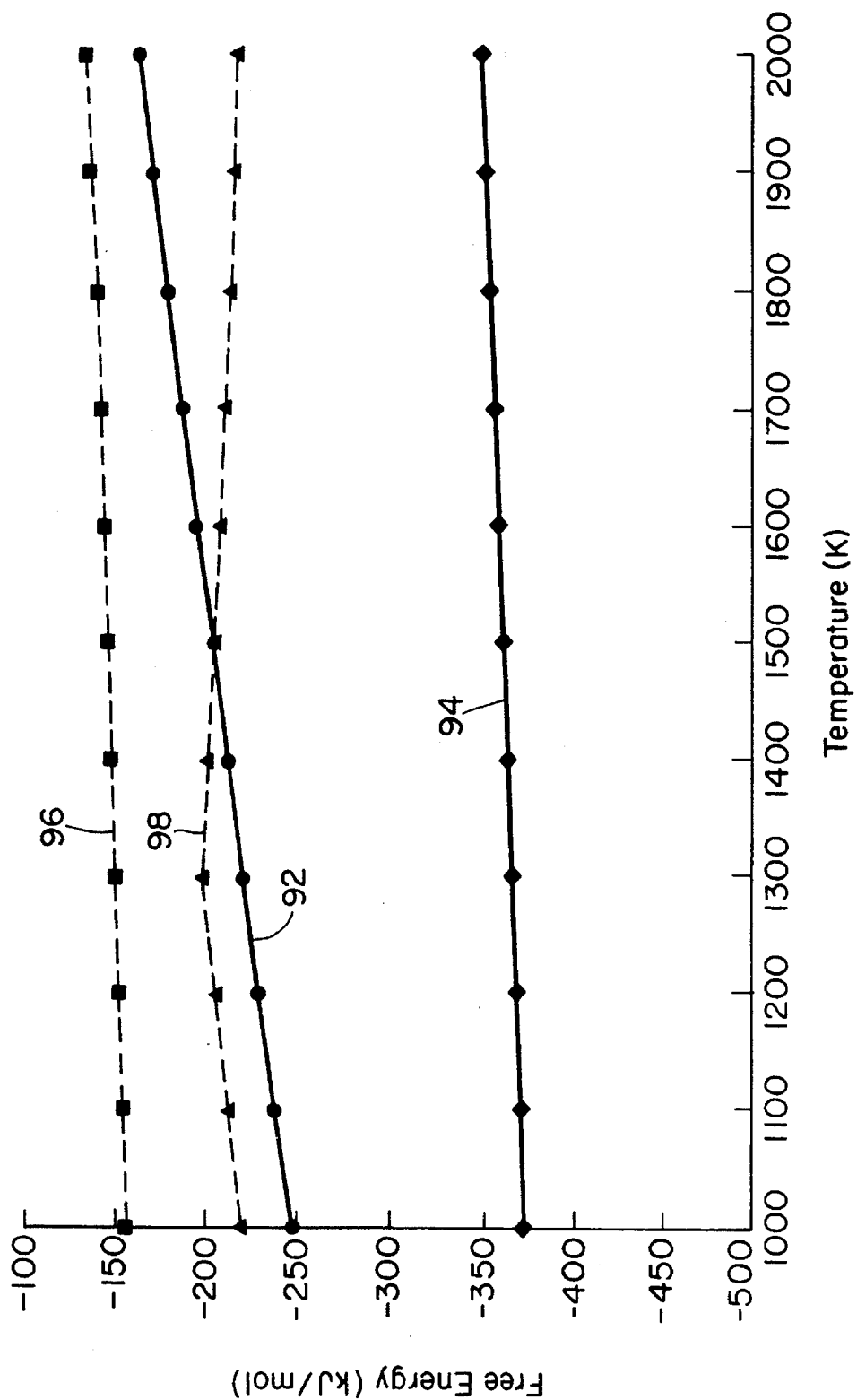
FIG. 4 is a plot of the free energies of reaction of chlorine, as an oxidizing agent, with iron and uranium according to still another embodiment of the method of the invention.

The radioactive first component of the radioactive composition is oxidized by the first reagent in molten metal bath 68 to form an intermediate component, uranium chloride ($UCl_4$). The first reagent reacts preferentially with the radioactive first component rather than the iron because the free energies of oxidation of the radioactive first component, uranium chloride (Curves 92,94), are lower than those of the iron (Curve 96,98) in molten metal bath 68, as can be seen in FIG. 4. The uranium chloride volatilizes and migrates from molten metal bath 68 through vitreous layer 74 to gas layer 76.

Figure 5:
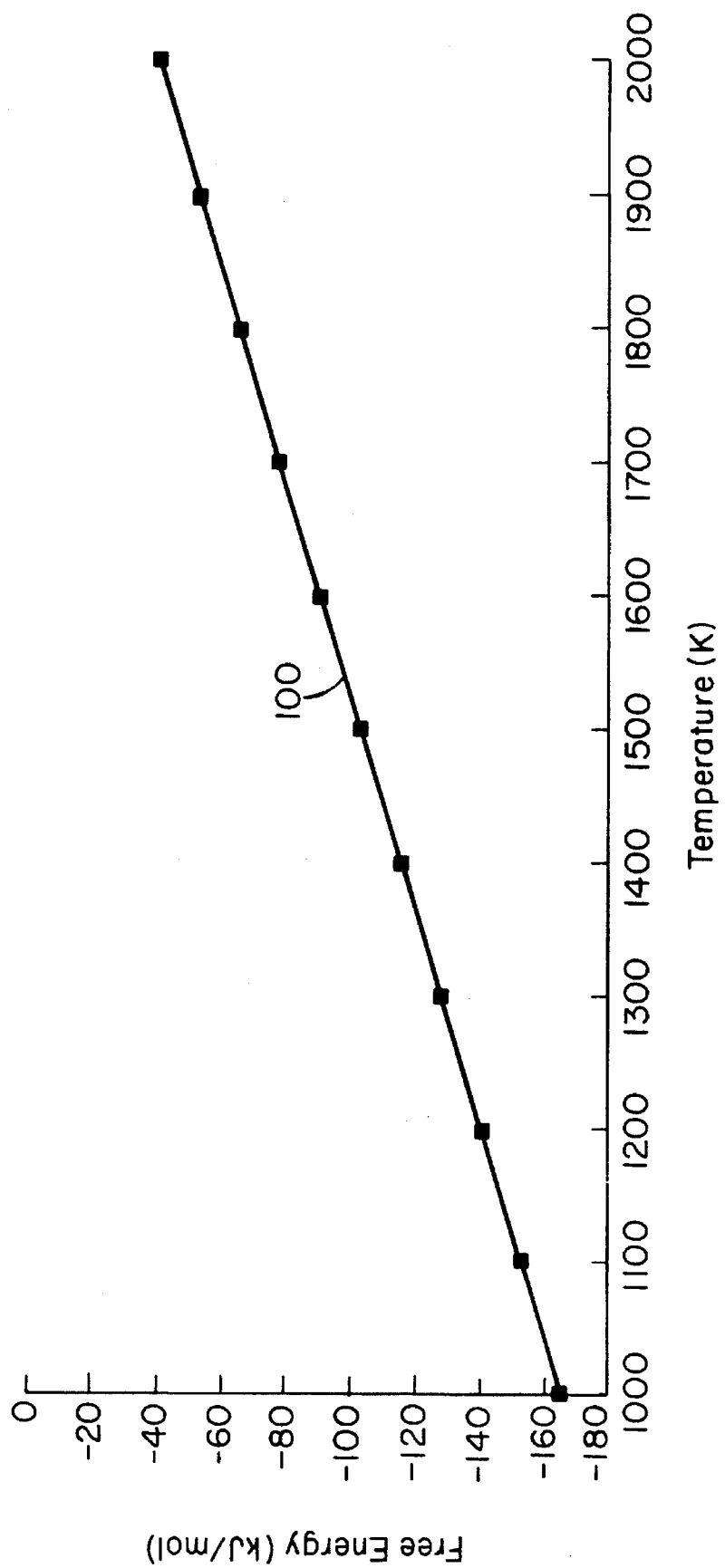
FIG. 5 is a plot of the free energies of oxidation of uranium chloride according to the embodiment referred to in the description of FIG. 4.

The intermediate component is then oxidized by oxygen gas, as a second reagent, which is added to gas layer 76 by a suitable means, such as top lancing or direct injection into the slag layer or at the gas layer/slag layer interface. The intermediate component, uranium chloride, is oxidized to uranium oxide. Reaction of the intermediate component with the second reagent (Curve 100) is highly favorable, as shown in FIG. 5, and results in the formation of $UO_2$ powder and $Cl_2$ gas. The uranium oxide is a solid which settles in the reaction zone and accumulates in vitreous layer 74.

The second component of radioactive composition is separated from radioactive first component in molten metal bath 68 as radioactive first component is oxidized by first reagent. Second component, which is iron, remains in molten metal bath 68. The second component is removed through bottom-tapping spout 38.

Illustration VI

A radioactive composition includes radioactive compounds bound in low concentration to an ion exchange resin. The radioactive component of the radioactive composition includes uranium, phosphorous (32), cesium (137), strontium (90), sulfur (35) and sodium (22). The non-radioactive component includes chloride ions and trimethylbenzlammonium salt which is chemically bound to a polystyrene ion exchange resin.

The radioactive composition is directed into a molten iron bath. Oxides of the radioactive element, such as uranium oxide ($UO_2^{2+}$) are insoluble in the molten iron bath and migrate to a vitreous phase formed on top of the molten iron bath. Similarly, other radioactive species, in the form of oxides or halides, also migrate, or can be made to migrate, from the molten metal bath to the vitreous layer, thereby separating the radioactive component from the residual organic and inorganic non-radioactive waste components, which remain in the molten iron bath.

The organic components dissociate to their respective elements upon contact with the molten iron bath. A stoichiometric amount of oxygen, in the form of a metal oxide (e.g., $FeO$, $FeO_2$, $O_3$) or an oxyanion (e.g., $NO_3^-$) is introduced to effect oxidation of dissolved carbon in the molten iron bath to form carbon monoxide, which volatilizes and migrates to a gas phase formed above the vitreous layer.

Fluoride ion, in the form, for example, of $FeF_2$ is directed into either the molten iron bath or into the vitreous layer, whereby a metal-ligand exchange reaction occurs with radioactive oxides, such as uranium oxide, to form, for example, uranium (IV) fluoride ($UF_4$). The uranium (IV) fluoride volatilizes and escapes from the vitreous layer, thereby effecting a separation of a volatilizable radioactive component from other, non-volatilizable radioactive components in the vitreous layer. Examples of non-volatilizable radioactive components include cesium (Ce(137)), strontium (Sr(90)), sulfur (S(35)), and sodium (Na(22)) which remain bound in the vitreous layer as oxides or halides.

The density differential and insolubility of highly-charged oxides, halides and sulfides that comprise the vitreous layer, such as different molecular properties, charge distribution, volatility, and density enable separation of these radioactive components from organic and inorganic components of a radioactive waste composition. For example, highly-charged species, such as uranium (IV) fluoride are insoluble in the molten metal phase. Consequent phase separation affords the utility of potential recovery and conversion of uranium (IV) fluoride to useful commercial product by either reduction or ligand exchange when deemed desirable.

Illustration VII

A radioactive composition, which includes nickel piping contaminated with uranium and plutonium, is directed into a molten nickel bath. Uranium and plutonium are in the form of oxides which are bound to the surface of the nickel piping. The non-radioactive component is the nickel. Upon introduction to the molten nickel bath, the nickel of the piping melts, whereby the radioactive components of the waste are distributed within the molten nickel bath. Nickel fluoride is directed into the bath as a metal-ligand exchange reagent. The nickel fluoride reacts with the uranium (IV) oxide and plutonium (IV) oxide to form uranium (IV) fluoride and plutonium (IV) fluoride.

The uranium (IV) fluoride volatilizes and migrates from the molten nickel bath to a vitreous phase, where it is collected via a chemical reaction with calcium oxide, thereby effecting separation of the radioactive uranium from the contaminated nickel piping.

Illustration VIII

A radioactive composition, which includes nickel piping that is contaminated with uranium, as a long-lived radionuclide, and iodine, as a short-lived radionuclide, is directed into a molten nickel bath. Upon introduction of the radioactive composition into the molten nickel bath, the nickel piping melts and the iodine volatilizes, thereby migrating out of the molten nickel bath as a gas. The short-lived radionuclide, iodine, is thereby separated from the long-lived radionuclide, uranium. Oxygen is then injected into the molten nickel bath to oxidize the uranium. The oxidized uranium consequently separates from the molten nickel bath and migrates to a vitreous layer formed above the molten nickel bath. The long-lived radionuclide is thereby separated from the remaining non-radioactive material, such as the nickel of the nickel piping, which remains in the molten nickel bath.

Equivalents

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A method for producing a non-radioactive product from a radioactive waste composition that includes a radioactive component and a non-radioactive component, comprising the steps of:

(a) directing the radioactive waste into a molten metal bath; and (b) directing a separation reagent into the molten metal bath which reacts with a component of the radioactive waste composition to form a radioactive reaction product that separates from the molten metal bath and from the non-radioactive component, thereby forming a non-radioactive product.

2. The method of claim 1 wherein the separation reagent causes the radioactive component to form a salt.

3. A method for producing a non-radioactive product from a radioactive waste composition that includes a radioactive component and a non-radioactive component, comprising the steps of:

(a) directing the radioactive waste into a molten metal bath; and (b) directing a metal-ligand exchange reagent into the molten metal bath which reacts with a component of the radioactive waste composition to form a reaction product that separates from the molten metal bath and from the remaining component, thereby forming a non-radioactive product.

4. A method for producing a non-radioactive product from a radioactive waste composition that includes a radioactive component and a non-radioactive component, comprising the steps of:

(a) directing the radioactive waste into a molten metal bath; and (b) directing a separation reagent into the molten metal bath which reacts with the non-radioactive component of the radioactive waste composition to form a reaction product that separates from the molten metal bath and from the remaining component, thereby forming a non-radioactive product.

5. A method of claim 4 wherein the separation reagent causes the non-radioactive component to separate from the molten metal bath and the radioactive component as a liquid which is substantially insoluble in the molten metal bath.

6. A method of claim 4 wherein the separation reagent causes the non-radioactive component to separate as a precipitate from the molten metal bath and from the radioactive component.

7. A method of claim 6 wherein the separation reagent causes the non-radioactive component to form a salt.

8. A method of claim 7 wherein the salt migrates from the bath to a vitreous layer above the molten metal bath.

9. A method of claim 6 wherein the separation reagent oxidizes the non-radioactive component.

10. A method of claim 9 wherein the non-radioactive product migrates from the bath to a vitreous layer above the molten metal bath.

11. A method of claim 10 wherein the separation reagent includes oxygen.

12. A method of claim 4 wherein the separation reagent causes the non-radioactive component to separate from the molten metal bath as a gas.

13. A method of claim 12 wherein separate reagent includes a halogen.

14. A method of claim 13 wherein the halogen is fluorine.

15. A method of claim 12 wherein the separation reagent includes oxygen.

16. A method of claim 15 wherein the non-radioactive component of the radioactive waste composition includes carbon and the non-radioactive reaction product includes a carbon oxide.

17. A method of claim 16 wherein the carbon oxide includes carbon monoxide.

18. A method of claim 16 wherein the carbon oxide includes carbon dioxide.

19. A method of claim 4 further including the step of directing a metal-ligand exchange reagent into the molten metal bath which reacts with the radioactive component to cause the radioactive component in the molten metal bath to volatilize.

20. A method for producing a non-radioactive product from a radioactive waste composition, comprising the steps of:

(a) directing a radioactive waste composition, which includes a non-radioactive component and more than one radioactive component, into a molten metal bath; and (b) directing a separation reagent into the molten metal bath which reacts with a component of the radioactive waste composition to form a reaction product that separates from the molten metal bath and form the remaining components, thereby forming a non-radioactive product.

21. A method of claim 20 wherein a metal-ligand exchange reagent is directed into the molten metal bath, said metal-ligand exchange reagent reacting with less than all of the radioactive elements of the radioactive component, whereby the radioactive reaction product of the reaction with the metal-ligand exchange reagent volatilizes and separates from the remaining radioactive element.

22. A method of claim 21 wherein the non-radioactive component of the waste includes carbon.

23. A method of claim 22 wherein the non-radioactive component is oxidized by the separation reagent.

24. A method of claim 23 wherein the non-radioactive reaction product is a precipitate which migrates from the bath to a vitreous layer above the molten metal bath.

25. A method of claim 23 wherein the non-radioactive reaction product is a gas.

26. A method of claim 25 wherein the gas includes a carbon oxide.

27. A method of claim 26 wherein the carbon oxide includes carbon monoxide.

28. A method of claim 26 wherein the carbon oxide includes carbon dioxide.

29. A method of claim 21 wherein the non-radioactive component of the waste composition is an oxide which separates from the radioactive component of the radioactive composition in the molten metal bath by migrating from the molten metal bath to a vitreous layer formed above the molten metal bath.

30. A method of claim 29 wherein the separation reagent reacts with the remaining radioactive element in the molten metal bath to cause the radioactive element to separate from said molten metal bath.

31. A method for producing a non-radioactive product from a radioactive waste composition that includes a radioactive component and a non-radioactive component, comprising the steps of:

a) directing radioactive waste into a molten metal bath; and b) directing a separation reagent into the molten metal bath which reacts with the radioactive component to form a radioactive reaction product that separates from the molten metal bath and from the remaining component, said remaining component thereby forming the non-radioactive product.

32. A method for producing a non-radioactive product from a radioactive waste composition that includes a radioactive component and a non-radioactive component, comprising the steps of:

a) directing the radioactive waste into a molten metal bath; and b) directing a separation reagent into the molten metal bath which reacts with the non-radioactive component to form a non-radioactive product that separates from the molten metal bath and from the remaining radioactive component.

33. A method for producing a non-radioactive product from a radioactive waste composition that includes a radioactive component and a non-radioactive component, comprising the steps of:

a) directing the radioactive waste into a molten metal bath;

b) directing a separation reagent into the molten metal bath which reacts with the non-radioactive component to form a non-radioactive product that separates from the molten metal bath and from the remaining radioactive component; and c) directing a metal-ligand exchange reagent into the molten metal bath which reacts with the radioactive component to form a radioactive reaction product, which separates from the molten metal bath.

34. A method for producing a non-radioactive product from a radioactive waste composition that includes a radioactive component and a non-radioactive component, comprising the steps of:

a) directing the radioactive waste into a molten metal bath;

b) directing a metal-ligand exchange reagent into the molten metal bath which reacts with the radioactive component to form a metal-ligand exchange reaction product that separates from the molten metal bath and from the remaining non-radioactive component; and c) directing the separation reagent into the molten metal bath which reacts with the non-radioactive component to form a non-radioactive product that separates from the molten metal bath.

35. A method for producing a non-radioactive product from a radioactive waste composition that includes more than one radioactive component and a non-radioactive component, comprising the steps of:

a) directing the radioactive waste into a molten metal bath;

b) directing a separation reagent into the molten metal bath which reacts with the non-radioactive component of the radioactive waste composition to form a non-radioactive product that separates from the molten metal bath and from the remaining radioactive components; and c) directing a metal-ligand exchange reagent into the molten metal bath which reacts with the radioactive components to form radioactive reaction products, at least one of which separates from the molten metal bath.

36. A method for separating a radioactive component from a waste composition that includes at least one radioactive component, comprising the steps of:

a) directing the waste composition into a molten metal bath; and b) directing a separation reagent into the molten metal bath which reacts with the radioactive component of the waste composition to form a radioactive reaction product that separates from the molten metal bath and from at least one remaining component of the waste composition.

37. A method for separating a radioactive component from a waste composition that includes at least two radioactive components having different levels of radioactivity, comprising the steps of:

a) directing the waste composition into a molten metal bath; and b) directing a separation reagent into the molten metal bath which reacts with less than all of the radioactive component, whereby a radioactive reaction product forms which separates from the molten metal bath and from at least one remaining radioactive component having a different level of radioactivity than that of the radioactive component which reacts with the separation reagent.

38. A method for producing a non-radioactive product from a radioactive waste composition that includes a radioactive component and a non-radioactive component, comprising the steps of:

a) directing the radioactive waste into a molten metal bath; and b) directing a separation reagent into the molten metal bath which oxidizes the radioactive component of the radioactive waste composition to form a radioactive reaction product that separates from the molten metal bath and from the non-radioactive component, thereby forming a non-radioactive product.

39. A method of claim 38 wherein the separation reagent includes oxygen.

40. A method of claim 38 wherein the separate reagent includes at least one oxidized transition metal.

41. A method for producing a non-radioactive product from a radioactive waste composition that includes a radioactive component and a non-radioactive component, comprising the steps of:

a) directing the radioactive waste into a molten metal bath; and b) directing a separation reagent into the molten metal bath which reacts with a component of the radioactive waste composition to form a radioactive reaction product that separates from the molten metal bath and from the non-radioactive component as a gas, thereby forming a non-radioactive product.

42. A method of claim 41 wherein the separation reagent includes a halogen.

43. A method of claim 42 wherein the halogen is fluorine.

44. A method for producing a non-radioactive product from a radioactive waste composition that includes a radioactive component and a non-radioactive component, comprising the steps of:

a) directing the radioactive waste into a molten metal bath; and b) directing a separation reagent into the molten metal bath which reduces the radioactive component of the radioactive waste composition to form a radioactive reaction product that precipitates from the molten metal bath and from the non-radioactive component, thereby forming a non-radioactive product.

45. A method of claim 44 wherein the separation reagent includes carbon.

46. A method of claim 44 wherein the separate reagent includes at least one transition metal.

* * * * *